(12) United States Patent
Kownacki

(10) Patent No.: US 7,496,782 B1
(45) Date of Patent: Feb. 24, 2009

(54) SYSTEM AND METHOD FOR SPLITTING A CLUSTER FOR DISASTER RECOVERY

(75) Inventor: Ronald William Kownacki, Pittsburgh, PA (US)

(73) Assignee: Network Appliance, Inc., Sunnyvale, CA (US)

(*) Notice: Subject to any disclaimer, the term of this patent is extended or adjusted under 35 U.S.C. 154(b) by 510 days.

(21) Appl. No.: 10/858,150

(22) Filed: Jun. 1, 2004

(51) Int. Cl.
*G06F 11/00* (2006.01)

(52) U.S. Cl. ................. 714/4; 714/10; 714/11; 714/13; 714/43

(58) Field of Classification Search .......... 714/4, 714/6, 11, 12, 13, 27, 16, 43, 20, 56; 709/220, 709/221
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,633,999 A | 5/1997 | Clowes et al. | |
| 5,781,770 A | 7/1998 | Byers et al. | |
| 5,812,748 A | 9/1998 | Ohran et al. | |
| 5,812,751 A | 9/1998 | Ekrot et al. | |
| 5,951,695 A | 9/1999 | Kolovson | |
| 6,119,244 A | 9/2000 | Schoenthal et al. | |
| 6,292,905 B1 | 9/2001 | Wallach et al. | |
| 6,542,929 B1 * | 4/2003 | Briskey et al. ............... 714/4 |
| 6,625,749 B1 | 9/2003 | Quach | |
| 6,675,217 B1 * | 1/2004 | Dani et al. ................. 714/4 |
| 6,728,897 B1 | 4/2004 | Cramer et al. | |
| 7,016,946 B2 * | 3/2006 | Shirriff ..................... 714/6 |
| 7,120,821 B1 * | 10/2006 | Skinner et al. ............. 714/4 |

* cited by examiner

*Primary Examiner*—Robert Beausoliel
*Assistant Examiner*—Joseph D Manoskey
(74) *Attorney, Agent, or Firm*—Cesari and McKenna, LLP

(57) ABSTRACT

The present invention provides a system and method for disaster recovery split of a node from a cluster to enable cluster management operations using quorum-based data replication services to continue. A split command is executed on a selected node and a new site list data structure describing the cluster is generated. The site list data structure marks all nodes other than the selected node as ineligible, thereby placing the selected node in quorum.

38 Claims, 11 Drawing Sheets

SYSTEM AND METHOD FOR SPLITTING A CLUSTER FOR DISASTER RECOVERY

FIELD OF THE INVENTION

The present invention is directed to disaster recovery of network clusters and, in particular to splitting a node in a cluster to enable write capability for replicated data management.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif. The SpinFS file system is implemented within a storage operating system having a protocol stack and associated disk storage.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity partitions in a single disk) arranged according to a RAID 4, or equivalent high-reliability, implementation.

It is advantageous for the services and data provided by a filer or storage system to be available for access to the greatest degree possible. Accordingly, some storage system environments provide a plurality of storage systems (i.e. nodes) in a cluster where data access request processing may be distributed among the various nodes of the cluster. Executing on each node is a collection of management processes that provides management of configuration information (management data) for the nodes. Each of these processes has interfaces to a replicated database (RDB) that provides a persistent object store for the management data. In addition, the RDB replicates and synchronizes changes (updates) made to the management data by the management processes across all nodes of the cluster.

Specifically, the RDB cluster is described by a site list, which contains cluster configuration information, and is replicated on all the nodes of the cluster. The site list contains the following information: (1) a version of the cluster, (2) a cluster identifier, (3) a set of site descriptions. Each site description includes: (1) a site identifier that is unique within the cluster, (2) a host name of the node, (3) a network address(es) of the node and (4) a state of the node. The site list is maintained via a management interface provided by one of the management processes executing on each node. All changes to the site list are made under transactional control of the RDB. The site list (and its changes/updates) is automatically propagated throughout the nodes of the cluster as part of a RDB voting protocol that uses version-checking to ensure that all cluster node "members" are in agreement and up-to-date (synchronized) with respect to cluster configuration. Note that database synchronization uses a different mechanism (handled by the recovery manager).

In cluster environments the concept of a quorum exists to ensure the correctness of the data replication algorithm, even in the event of a failure of one or more nodes of the cluster. By "quorum" it is meant generally a majority of the "healthy" (i.e. operational) nodes of the cluster. That is, a cluster is in quorum when a majority of the nodes are operational and have connectivity to other nodes; in addition, all nodes in the quorum have read/write (RW) access to the replicated management data (i.e. can participate in incremental updates to that data). By requiring that each update be synchronously propagated to a majority of the nodes (a quorum), the replication algorithm is guaranteed to retain all updates despite failures.

Broadly stated, a quorum of nodes is established by (1) ensuring connectivity among a majority of operational nodes; (2) synchronizing a baseline of management data among the nodes and (3) allowing a majority of operational nodes to participate in incremental changes to that baseline data. In clusters containing an even number of nodes, e.g., four nodes, one of the nodes is typically assigned an epsilon value to its quorum weight, thereby enabling quorum formation without a strict majority, e.g., (2+e)/4 is sufficient. In a two-node cluster, (1+e)/2 is sufficient (the single epsilon node). The epsilon assignment is an aspect of cluster configuration; all the nodes must agree on the epsilon assignment.

The value of requiring quorum for update in a cluster lies in the correctness and completeness of replication. This is illustrated by the "partition" problem. A partition occurs when connectivity is lost to one set of nodes as a result of a power failure or other failures to the cluster. The cluster may continue to operate with the remaining set of nodes; all nodes can read their management data, and if that set is sufficient to meet quorum requirements, all the member nodes can update the data. If connectivity is then lost within this set, and is subsequently restored to the other set of nodes, it is possible that the second set will have access only to the management data present before the first connectivity failure. In this case, it will not be able to form quorum, and will not be able to perform updates. If there were a sufficient number of nodes to establish quorum, then at least one of them would have seen the latest updates (as a participant in the prior quorum), and all the nodes in the second set would have the update capability. The quorum requirement guarantees that updates can only be made when the latest data is available.

A noted disadvantage of such quorum-based data replication systems is the inability to meet quorum requirements, thereby preventing any update (write) operations from occurring. This can occur as a result of communication failures, problems with health of individual node(s), or a combination of these problems. In clusters that utilize these services, the inability to form quorum may prevent an administrator from modifying the management data so as to reconfigure the cluster into an operational state.

SUMMARY OF THE INVENTION

The present invention overcomes the disadvantages of the prior art by providing a technique for splitting a selected node from a cluster using a disaster recovery tool, e.g., an administrative split command that is executed on the selected node of the cluster. The split command tool is employed in response to an error condition (e.g. a loss of connectivity) among the nodes of the cluster. In the event of a failure of the cluster resulting in the impossibility of a quorum being achieved, an administrator enters the split command through a user interface provided by a management framework process executing on selected node. The split command designates the selected node as a full "read/write (RW) replica" of the cluster, circumventing typical quorum requirements. As a full RW replica, the selected node can modify (update) configuration information (updated management data) used to manage the nodes of the cluster.

According to an aspect of the invention, the split command generates a modified site list on the selected node, which marks the selected node as eligible and holding the epsilon assignment. Specifically, the site list is modified by incrementing a version of the list, generating a new cluster ID (CID), enabling the selected node (marking the node as eligible) and assigning that node the epsilon value. In addition, all other nodes in the cluster are disabled (marked as ineligible), resulting in a cluster configuration of the selected node being in quorum (with itself). Quorum is thereby formed with a 1/1 majority; the "ineligible" nodes do not participate in either the numerator or denominator. The administrator then corrects the error condition that caused the cluster to fall out of quorum. As the error conditions are corrected, the ineligible nodes can be brought back into the quorum using the unsplit command. The operator brings the healthy nodes in one-by-one, selectively, using unsplit. A major failure might damage some of the nodes, so the selectivity is important. Bringing all of them online is a repeated node-by-node application of split.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
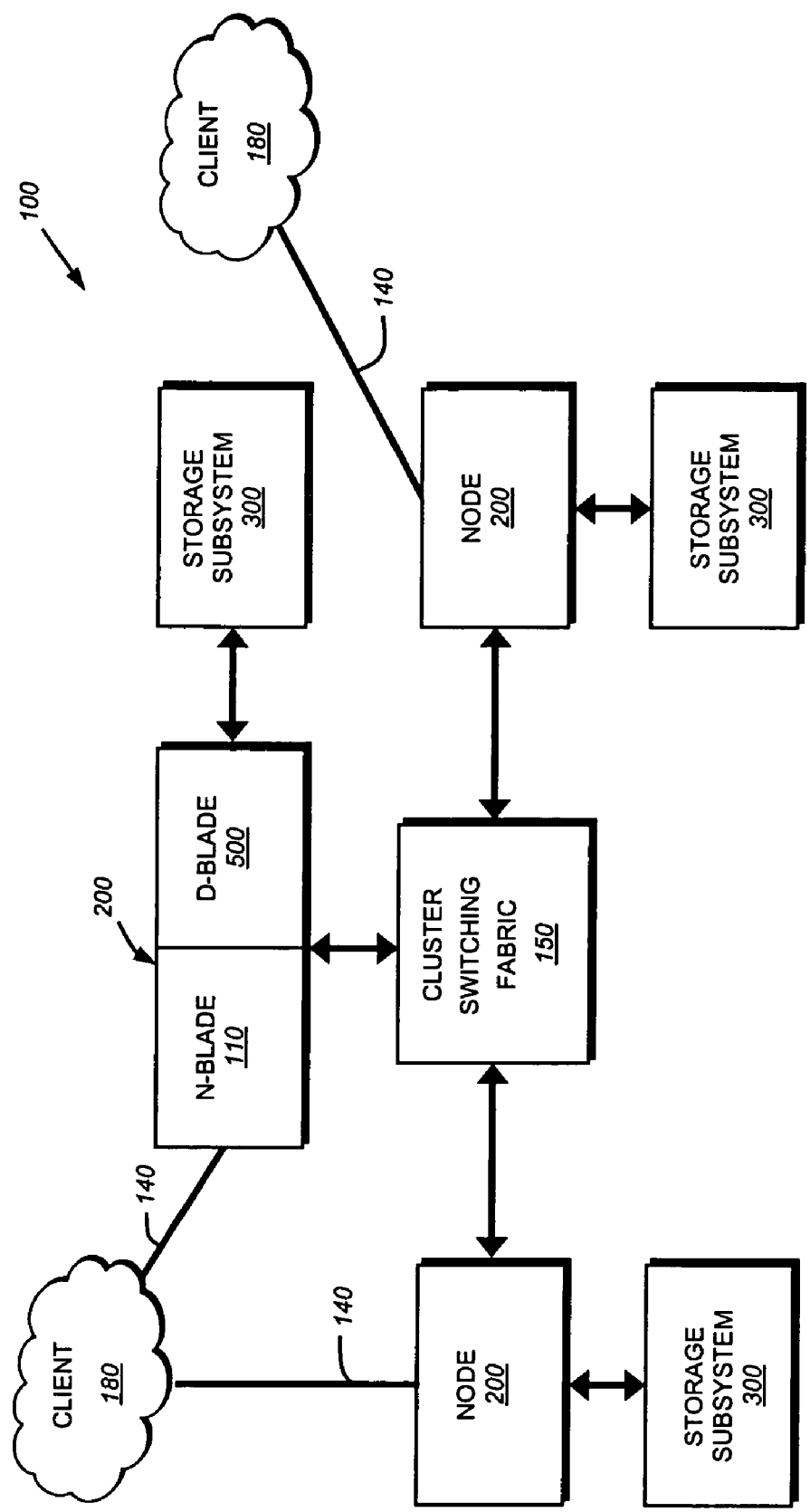
FIG. 1 is a schematic block diagram of a plurality of nodes interconnected as a cluster that may be advantageously used with the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each SpinFS node 200 is generally organized as a network element (N-blade 110) and a disk element (D-blade 500). The N-blade 110 includes a plurality of ports that couple the node 200 to clients 180 over a computer network 140, while each D-blade 500 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Patent Application Publication No. US 2002/0116593 titled Method and System for Responding to File System Requests, by M. Kazar et al. published Aug. 22, 2002.

B. Storage Systems

Figure 2:
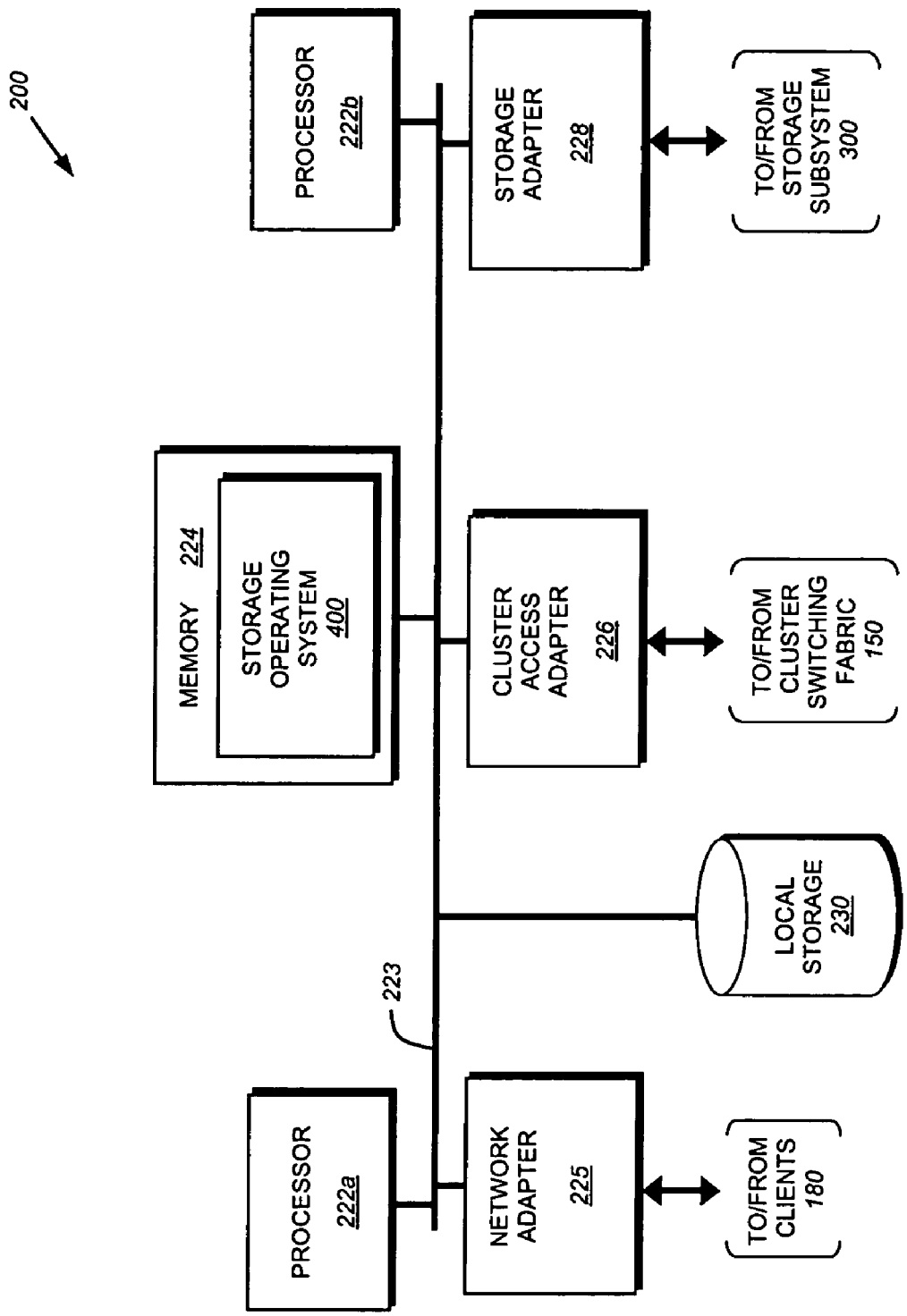
FIG. 2 is a schematic block diagram of a node that may be advantageously used with the present invention.

FIG. 2 is a schematic block diagram of a node 200 that is illustratively embodied as a storage system server comprising a plurality of processors 222, a memory 224, a network adapter 225, a cluster access adapter 226, a local storage and a storage adapter 228 interconnected by a system bus 223. The local storage 230 is utilized by the node to store local configuration information (i.e. management data), including its local copy of a replicated database (RDB) 850 (see FIG. 8). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 400 that provides a file system configured to logically organize the information as a hierarchical structure of named directories and files on storage subsystem 300. However, it will be apparent to those of ordinary skill in the art that the node 200 may alternatively comprise a single or more than two processor system. Illustratively, one processor 222*a* executes the functions of the N-blade 110 on the node, while the other processor 222*b* executes the functions of the D-blade 500.

In the illustrative embodiment, the memory 224 comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by the processor 222 (or the adapter 228 itself) prior to being forwarded over the system bus 223 to the network adapter 225 where the information is formatted into packets or messages and returned to the clients.

Figure 3:
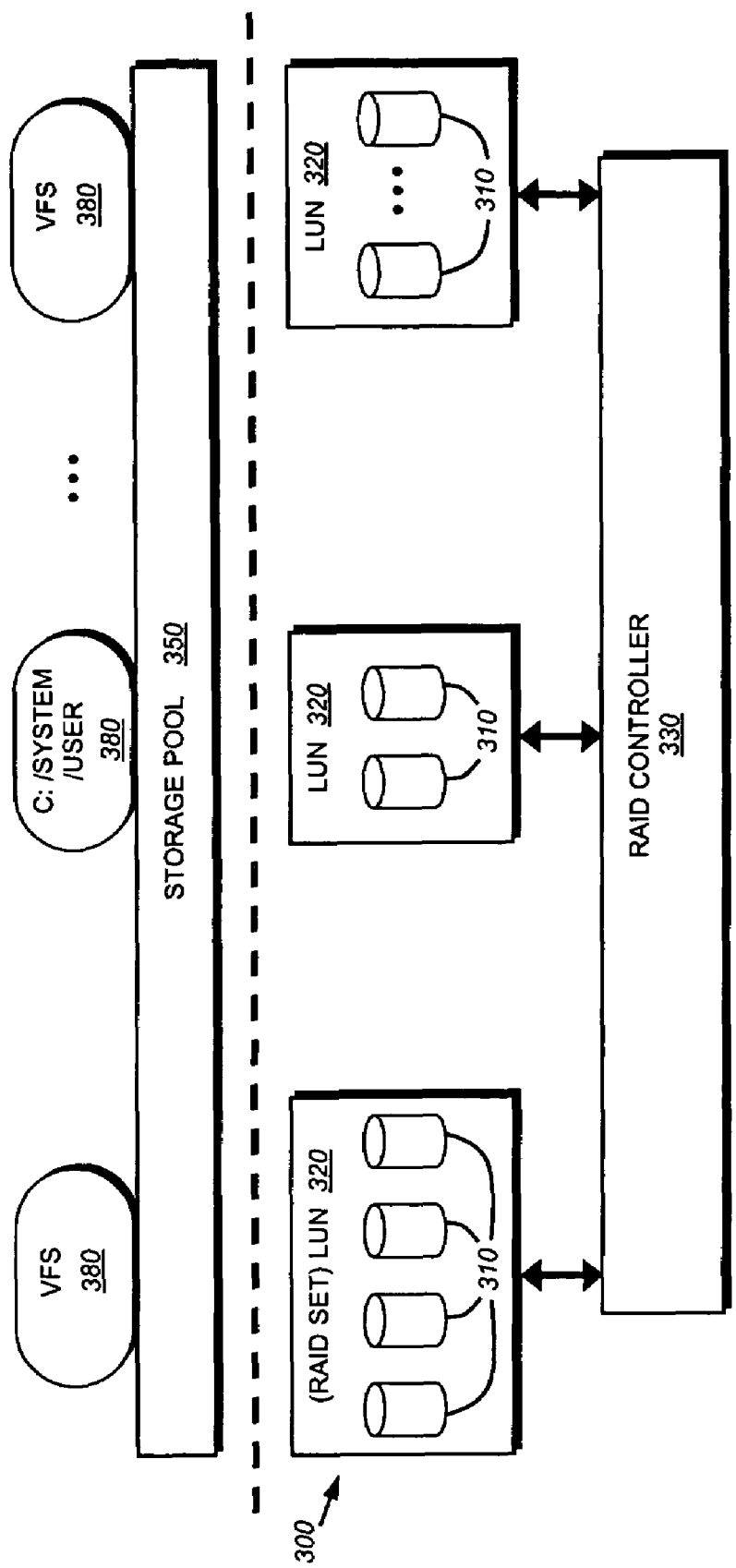
FIG. 3 is a schematic block diagram illustrating the storage subsystem that may be advantageously used with the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more RAID controllers 330. The RAID controller 330 exports a RAID set as a logical unit number (LUN 320) to the D-blade 500, which writes and reads blocks to and from the LUN 320. One or more LUNs are illustratively organized as a storage pool 350, wherein each storage pool 350 is "owned" by a D-blade 500 in the cluster 100. Each storage pool 350 is further organized as a plurality of virtual file systems (VFSs 380), each of which is also owned by the D-blade. Each VFS 380 may be organized within the storage pool according to a hierarchical policy that, among other things, allows the VFS to be dynamically moved among nodes of the cluster, thereby enabling the storage pool 350 to grow and shrink dynamically (on the fly).

In the illustrative embodiment, a VFS 380 is synonymous with a volume and comprises a root directory, as well as a number of subdirectories and files. A group of VFSs may be composed into a larger namespace. For example, a root directory (c:) may be contained within a root VFS ("/"), which is the VFS that begins a translation process from a pathname associated with an incoming request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFSs that are "stitched together" by mount point objects.

C. Storage Operating System

To facilitate access to the disks 310 and information stored thereon, the storage operating system 400 implements a write-anywhere file system, such as the SpinFS file system, which logically organizes the information as a hierarchical structure of named directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
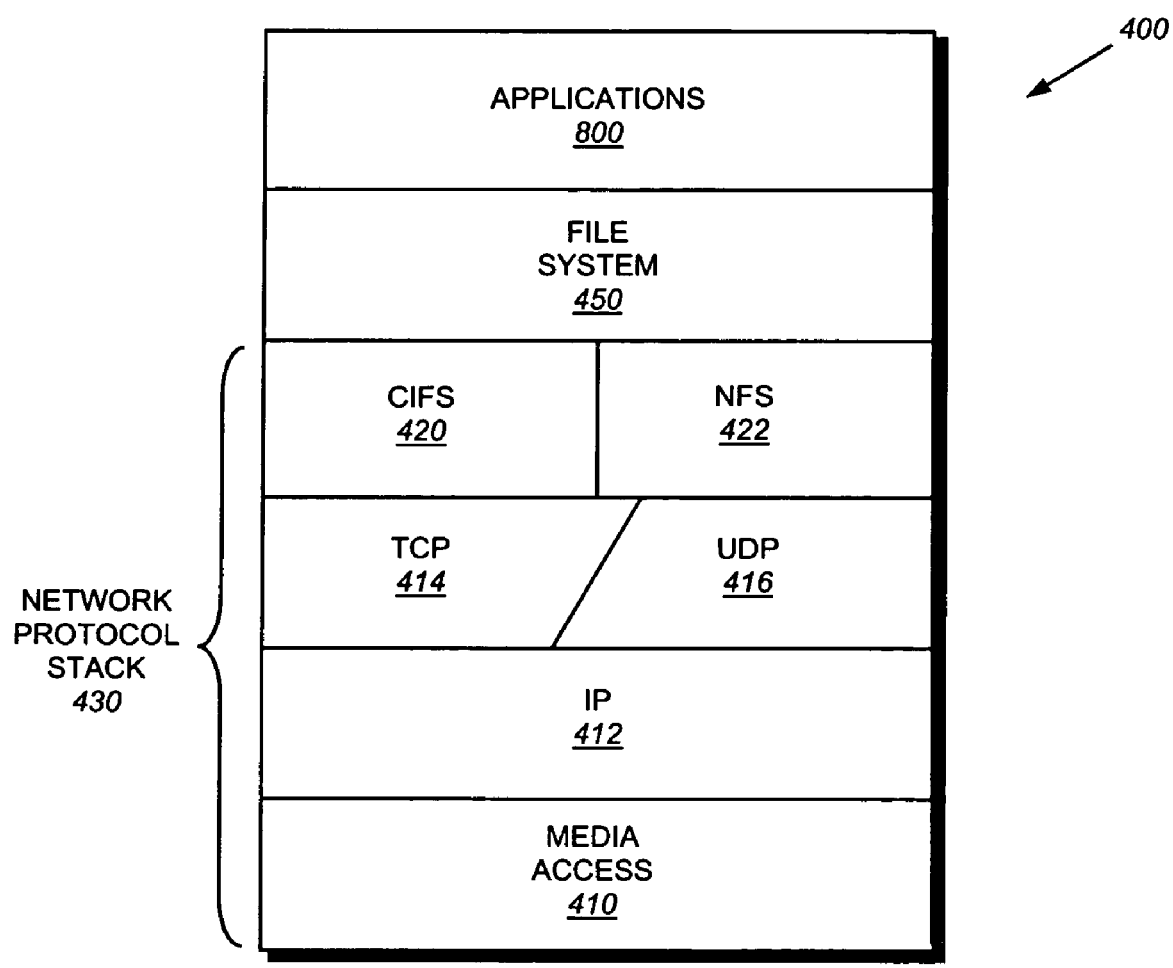
FIG. 4 is a partial schematic block diagram of a storage operating system that may be advantageously used with the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS file system) and, thus, includes support for the CIFS protocol 220 and the NFS protocol 222. As described further herein, a plurality of management processes executes as user mode applications 800.

In the illustrative embodiment, the processors 222 share various resources of the node 200, including the storage operating system 400. To that end, the N-blade 110 executes the integrated network protocol stack 430 of the operating system 400 to thereby perform protocol termination with respect to a client issuing incoming NFS/CIFS file access request packets over the network 150. The NFS/CIFS layers of the network protocol stack function as NFS/CIFS servers 422, 420 that translate NFS/CIFS requests from a client into SpinFS protocol requests used for communication with the D-blade 500. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

D. D-Blade

Figure 5:
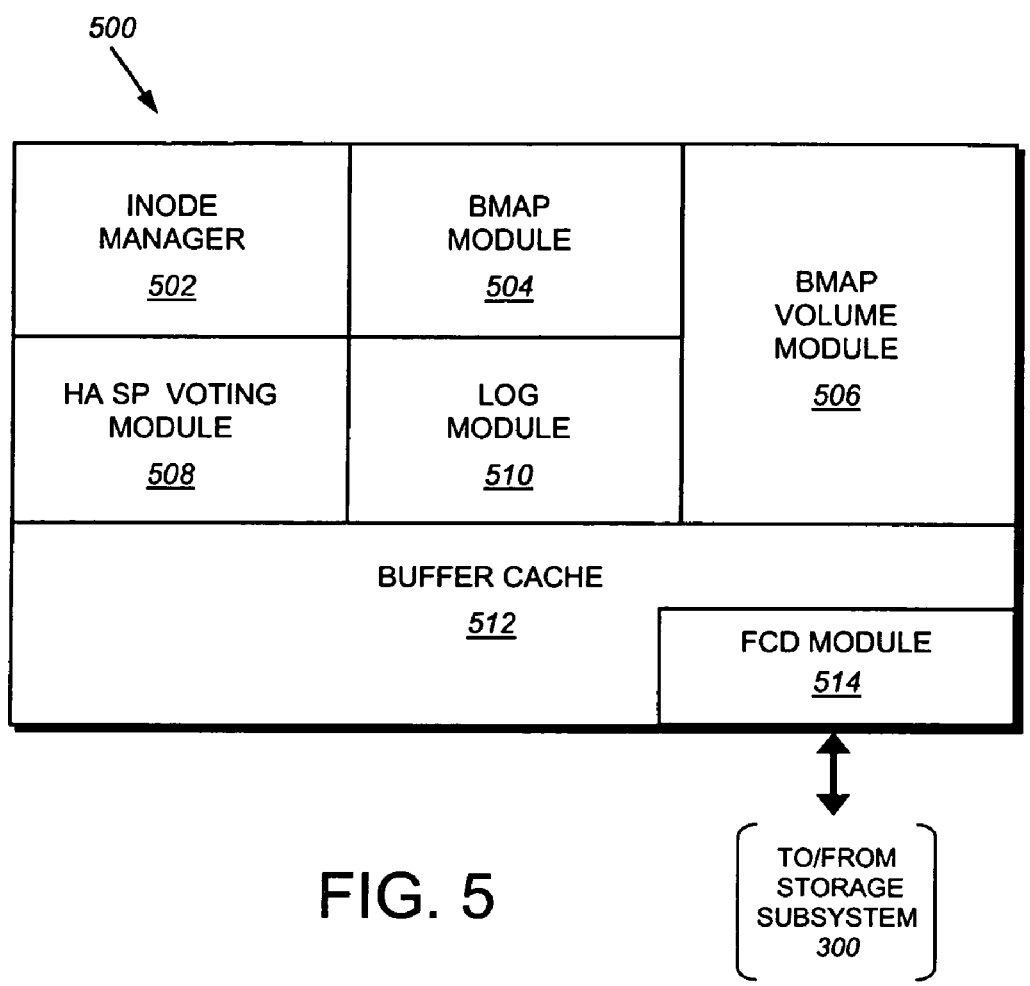
FIG. 5 is a schematic block diagram of a D-blade that may be advantageously used with the present invention.

Specifically, the NFS and CIFS servers of an N-blade 110 convert the incoming file access requests into SpinFS requests that are processed by the D-blades 500 of the cluster 100. Each D-blade 500 provides a disk interface function through execution of the SpinFS file system 450. In the illustrative cluster 100, the file systems 450 cooperate to provide a single SpinFS file system image across all of the D-blades in the cluster. Thus, any network port of an N-blade that receives a client request can access any file within the single file system image located on any D-blade 500 of the cluster. FIG. 5 is a schematic block diagram of the D-blade 500 comprising a plurality of functional components including a file system processing module (the inode manager 502), a logical-oriented block processing module (the Bmap module 504) and a Bmap volume module 506. The inode manager 502 is the processing module that implements the SpinFS file system 450, whereas the Bmap module 504 is responsible for all block allocation functions associated with a write anywhere policy of the file system 450, including reading and writing all data to and from the RAID controller 330 of storage subsystem 300. The Bmap volume module 506, on the other hand, implements all VFS operations in the cluster 100, including creating and deleting a VFS, mounting and unmounting a VFS in the cluster, moving a VFS, as well as cloning (snapshotting) and mirroring a VFS. The D-blade also includes a high availability storage pool (HA SP) voting module 508, a log module 510, a buffer cache 512 and a fiber channel device driver (FCD).

E. SpinFS

Figure 6:
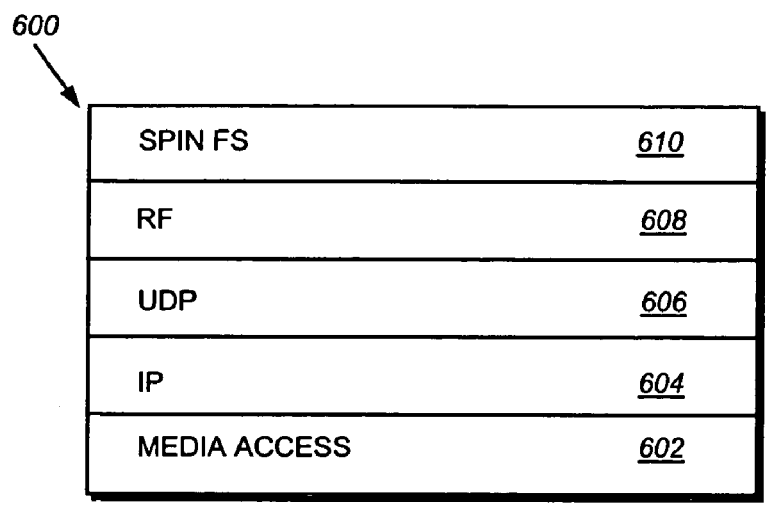
FIG. 6 is a schematic block diagram illustrating the format of a SpinFS request that may be advantageously used with the present invention.

The NFS and CIFS servers on the N-blade 110 translate respective NFS and CIFS requests into SpinFS primitive operations contained within SpinFS packets (requests). FIG. 6 is a schematic block diagram illustrating the format of a SpinFS request 600 that illustratively includes a media access layer 602, an IP layer 604, a UDP layer 606, an RF layer 608 and a SpinFS protocol layer 610. As noted, the SpinFS protocol 610 is a file system protocol that provides operations, related to those operations contained within incoming file access packets, to access files stored on the cluster 100. Illustratively, the SpinFS protocol 610 is datagram based and, as such, involves transmission of packets or "envelopes" in a reliable manner from a source (e.g., an N-blade) to a destination (e.g., a D-blade). The RF layer 608 implements a reliable transport protocol that is adapted to process such envelopes in accordance with a connectionless protocol, such as UDP 606.

Figure 7:
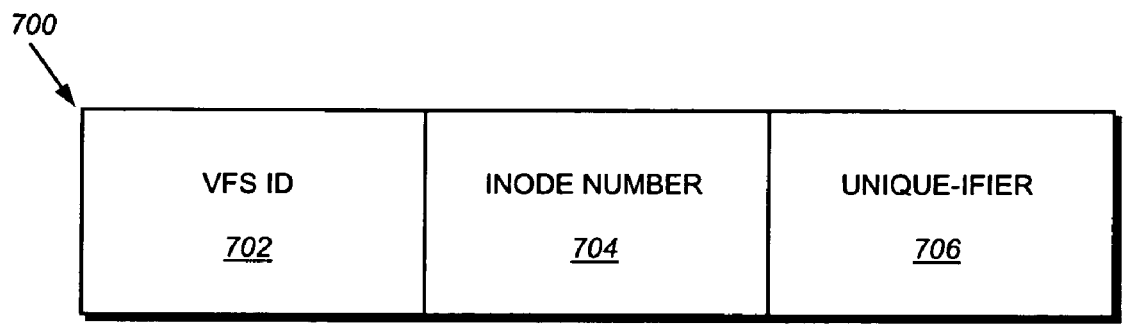
FIG. 7 is a schematic block diagram illustrating the format of a file handle that may be advantageously used with the present invention.

Files are accessed in the SpinFS file system 450 using a file handle. FIG. 7 is a schematic block diagram illustrating the format of a file handle 700 including a VFS ID field 702, an inode number field 704 and a unique-ifier field 706. The VFS ID field 702 contains an identifier of a VFS that is unique (global) within the entire cluster 100. The inode number field 704 contains an inode number of a particular inode within an inode file of a particular VFS. The unique-ifier field 706 contains a monotonically increasing number that uniquely identifies the file handle 700, particularly in the case where an inode number has been deleted, reused and reassigned to a new file. The unique-ifier distinguishes that reused inode number in a particular VFS from a potentially previous use of those fields.

Figure 8:
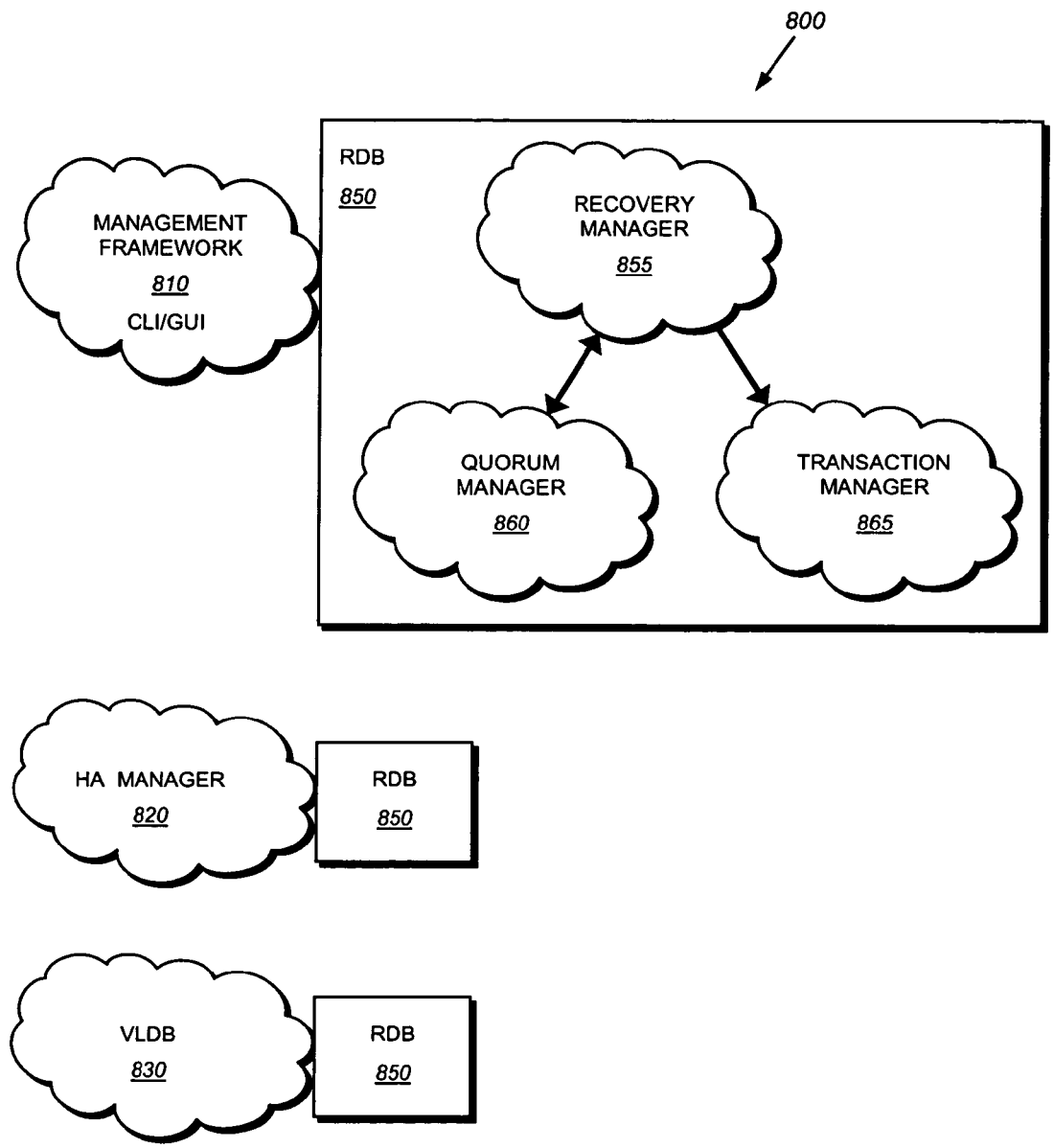
FIG. 8 is a schematic block diagram illustrating a collection of management processes that may be advantageously used with the present invention.

FIG. 8 is a schematic block diagram illustrating a collection of management processes that execute as user mode applications 800 on the storage operating system 400 to provide management of configuration information (i.e. management data) for the nodes of the cluster. To that end, the management processes include a management framework process 810, a high availability manager (HA Mgr) process 820, a VFS location database (VLDB) process 830, each utilizing a data replication service (RDB) 850 linked in as a library. The management framework 810 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 820 manages all network addresses (IP addresses) of all nodes 200 on a cluster-wide basis. For example, assume a network adapter 225 having two IP addresses (IP1 and IP2) on a node fails. The HA Mgr 820 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 820 is also responsible for functions such as monitoring an uninterrupted power supply (UPS) and notifying the D-blade to write its data to persistent storage when a power supply issue arises within the cluster.

The VLDB 830 is a database process that tracks the locations of various storage components (e.g., a VFS) within the cluster 100 to thereby facilitate routing of requests throughout the cluster. In the illustrative embodiment, the N-blade 110 of each node has a look up table that maps the VFS ID 702 of a file handle 700 to a D-blade 500 that "owns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 830. When encountering a VFS ID 702 that is not stored in its mapping table, the N-blade sends an RPC to the VLDB process. In response, the VLDB 830 returns to the N-blade the appropriate mapping information, including an identifier of the D-blade that owns the VFS. The N-blade caches the information in its look up table and uses the D-blade ID to forward the incoming request to the appropriate VFS 380.

All of these management processes have interfaces to (are closely coupled to) a replicated database (RDB) 850. The RDB comprises a library that provides a persistent object store (storing of objects) for the management data processed by the management processes. Notably, the RDB 850 replicates and synchronizes the management data object store access across all nodes 200 of the cluster 100 to thereby ensure that this RDB database is identical (has an identical image) on all of the nodes 200. For example, the HA Mgr 820 uses the RDB library 850 to monitor the status of the IP addresses within the cluster. At system startup, each node 200 records the status/state of its interfaces and IP addresses (those IP addresses it "owns") into the RDB database.

In the illustrative embodiment, the RDB 850 contains a number of components, inter alia, a recovery manager 855, a quorum manager 860 and a transaction manager 865. The recovery manager 855 oversees a distributed recovery mechanism of the RDB 850, and is responsible for synchronizing databases as nodes come into quorum. It interfaces with the quorum manager 855 and transaction manager 865. The quorum manager 860 manages quorum voting and heartbeat signals to ensure that the cluster is in quorum. Should the cluster and/or individual nodes fall in or out of quorum, the quorum manager 860 alerts the recover manager 855. The transaction manager 865 processes all RDB transactions, propagating them to remote in-quorum nodes, and ensuring that each is performed atomically (all or none).

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade 500 that "owns" that VFS, are determined. The appropriate server then translates the incoming request into a SpinFS request 600 that is routed to the D-blade 500. The D-blade receives the SpinFS request and apportions it into a part that is relevant to the requested file (for use by the inode manager 502), as well as a part that is relevant to specific access (read/write) allocation with respect to blocks on the disk (for use by the Bmap module 504). All functions and interactions between the N-blade 110 and D-blade 500 are coordinated on a cluster-wide basis through the collection of management processes and the RDB library user mode applications 800.

Figure 9:
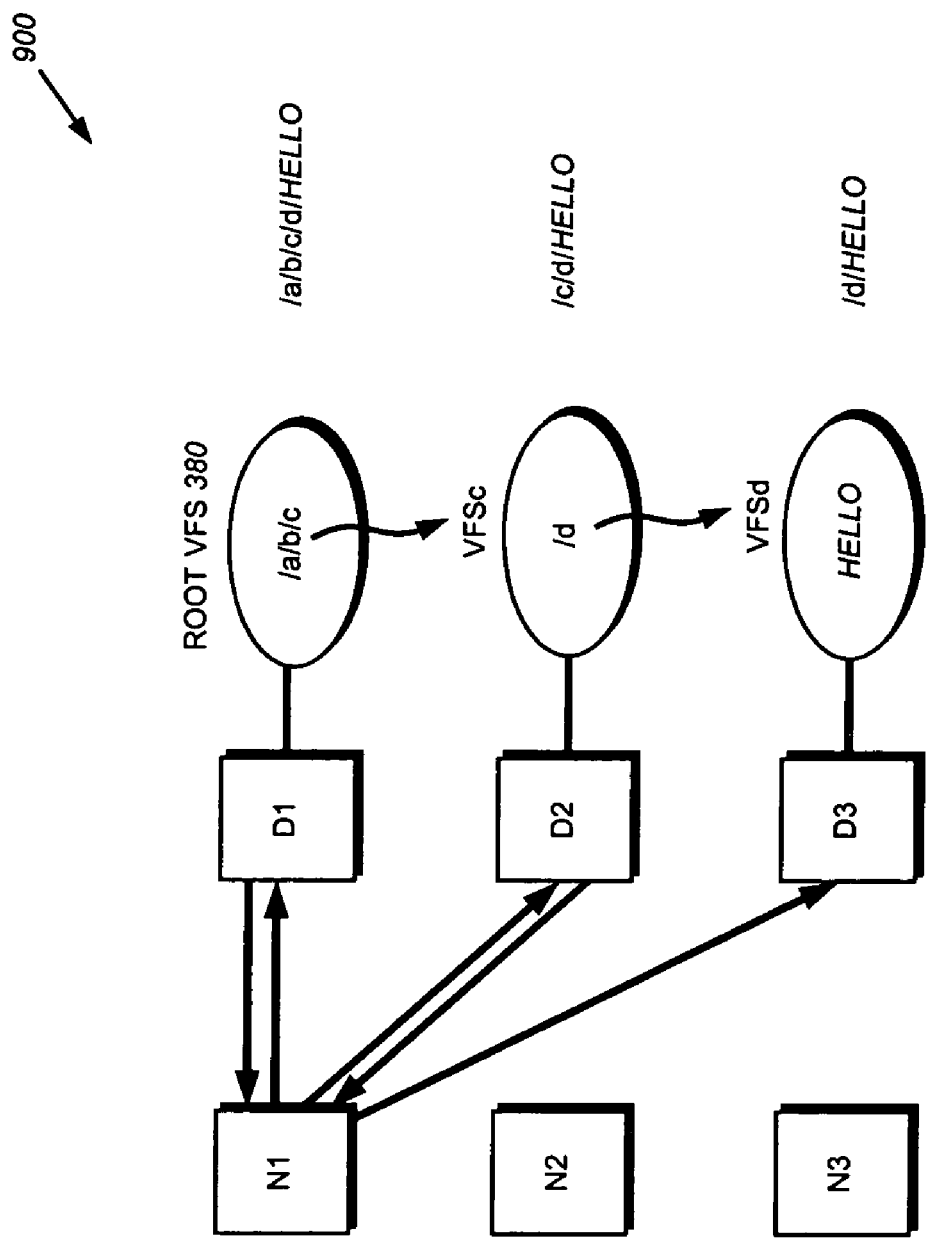
FIG. 9 is a schematic block diagram illustrating a distributed file system arrangement for processing a file access request in accordance with the present invention.

FIG. 9 is a schematic block diagram illustrating a distributed file system (SpinFS) arrangement 900 for processing a file access request at nodes 200 of the cluster 100. Assume a CIFS request packet specifying an operation directed to a file having a specified pathname is received at an N-blade 110 of a node 200. Specifically, the CIFS operation attempts to open a file having a pathname /a/b/c/d/Hello. The CIFS server 420 on the N-blade 110 performs a series of lookup calls on the various components of the pathname. Broadly stated, every cluster 100 has a root VFS 380 represented by the first "/" in the pathname. The N-blade 110 performs a lookup operation into the lookup table to determine the D-blade "owner" of the root VFS and, if that information is not present in the lookup table, forwards a RPC request to the VLDB 830 in order to obtain that location information. Upon identifying the D1 D-blade owner of the root VFS, the N-blade 110 forwards the request to D1, which then parses the various components of the pathname.

Assume that only a/b/ (e.g., directories) of the pathname are present within the root VFS. According to the SpinFS protocol, the D-blade 500 parses the pathname up to a/b/, and then returns (to the N-blade) the D-blade ID (e.g., D2) of the subsequent (next) D-blade that owns the next portion (e.g., c/) of the pathname. Assume that D3 is the D-blade that owns the subsequent portion of the pathname (d/Hello). Assume further that c and d are mount point objects used to vector off to the VFS that owns file Hello. Thus, the root VFS has directories a/b/ and mount point c that points to VFS c which has (in its top level) mount point d that points to VFS d that contains file Hello. Note that each mount point may signal the need to consult the VLDB 830 to determine which D-blade owns the VFS and, thus, to which D-blade the request should be routed.

The N-blade (N1) that receives the request initially forwards it to D-blade D1, which send a response back to N1 indicating how much of the pathname it was able to parse. In addition, D1 sends the ID of D-blade D2 which can parse the next portion of the pathname. N-blade N1 then sends to D-blade D2 the pathname c/d/Hello and D2 returns to N1 an indication that it can parse up to c/, along with the D-blade ID of D3 which can parse the remaining part of the pathname. N1 then sends the remaining portion of the pathname to D3 which then accesses the file Hello in VFS d. Note that the distributed file system arrangement 900 is performed in various parts of the cluster architecture including the N-blade 110, the D-blade 500, the VLDB 830 and the management framework 810.

The SpinFS architectures includes a cluster-wide node membership voting mechanism that allows the RDB 850 of each node 200 to vote for a master or coordinating RDB node. As discussed further herein, a coordinating RDB node is needed to "bring-up" or add nodes to a cluster, particularly when re-establishing a quorum after an error condition. This RDB voting mechanism involves message exchanges among members of a cluster over the cluster switching fabric 150.

F. Splitting a Cluster for Disaster Recovery

The present invention provides a technique for splitting a selected node from a cluster using a disaster recovery tool, namely an administrative split command that executes on the selected node. In the event of a protracted loss of quorum for any reason (communications breakdown or failures of nodes in the cluster), an administrator may execute a split command to mark all nodes but one as ineligible for use in a cluster. This results in the selected node being in quorum (1/1) and available for write operations. In an alternate embodiment, the selected node is also assigned an epsilon value, thereby making it in quorum (1+e)/2, which may be useful should another node be added and then quickly fail.

According to an aspect of the invention, the selected node uses the split command to generate a modified site list that marks the selected node as eligible and containing the epsilon. Specifically, the site list is modified by incrementing a version of the list, generating a new cluster ID (CID), enabling the selected node (marking the node as eligible) and assigning that node the epsilon value. In addition, all other nodes in the cluster are disabled (marked as ineligible), resulting in a cluster configuration of the selected node being in (1+e)/2 quorum (by itself). Note that "ineligible" nodes do not raise quorum requirements (the denominator) or count for quorum participation (the numerator). The generation of the new CID produces a new cluster, modeled on the original. It also effectively disables RDB-to-RDB communication between the new cluster and the ineligible nodes; this is essential for correctness (avoiding divergent updates within a cluster).

The administrator then corrects the error condition(s) that caused the cluster to fall out of quorum. As errors are corrected, the administrator can bring ineligible nodes back into the new cluster's quorum individually. This is accomplished by entering an unsplit command at the user interface of an ineligible node, which modifies it and brings it back into quorum. This error resolution and recovery process is typically iterative.

Figure 10:
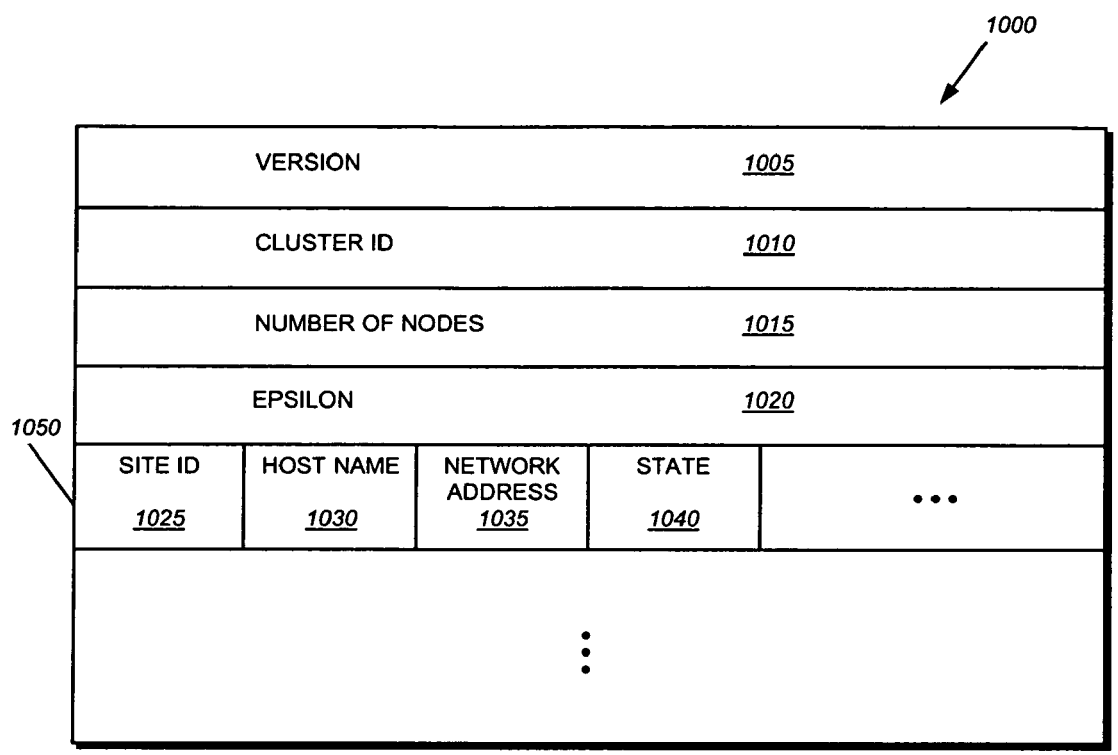
FIG. 10 is a schematic block diagram of an exemplary site list data structure in accordance with an embodiment of the present invention.

FIG. 10 is a schematic block diagram of an exemplary site list 1000 in accordance with an embodiment of the present invention. Illustratively, the site list is replicated throughout the cluster, stored on each node's local disk and managed by the RDB. When an administrator modifies the site list, e.g., to eliminate or add a new node to a cluster, the RDB distributes the newly modified site list to all nodes in the cluster. The site list 1000 contains a version field 1005, a cluster identifier field 1010, a number of nodes field 1015, an epsilon field 1020 and one or more entries 1050. Each entry 1050 contains a site ID field 1025, a host name field 1030, network address fields 1035 and a state field 1040. It should be noted that in alternate embodiments, each entry 1020 may have additional and/or differing fields and/or the site list 1000 may have additional and/or differing fields. The version field 1005 contains a version number of the site list. Typically, each time the site list for a particular cluster is modified, the version field 1005 is incremented, which enables nodes of the cluster to determine what site list is the most recent version. The cluster ID (CID) field 1010 contains an identifier uniquely specifying the cluster. The cluster ID may be generated by performing mathematical operations on such things as a time stamp of the creation of the cluster and/or the hardware addresses of one or more nodes of the cluster. Cluster members utilize the cluster ID to guarantee that RDB-to-RDB communication is intracluster only. The number of nodes field 1015 identify the number of nodes contained within the cluster and the number of entries 1050 contained within the site list. The epsilon field 1020 identifies the node, if any, that has the epsilon value associated with it for quorum voting purposes.

For each node in a cluster, there exists an entry 1050 within the site list. The site ID field 1025 uniquely identifies the node within the cluster. The host name field 1030 contains the local host name of the node. The state field 1035 determines whether this node is eligible or ineligible for inclusion in quorum requirements. Thus, if a node is going to be offline for a substantial period of time, for example to perform a software upgrade, it may be marked ineligible in the site list defining the cluster. Nodes that are marked ineligible in the site list do not count for quorum purposes.

Figure 11:
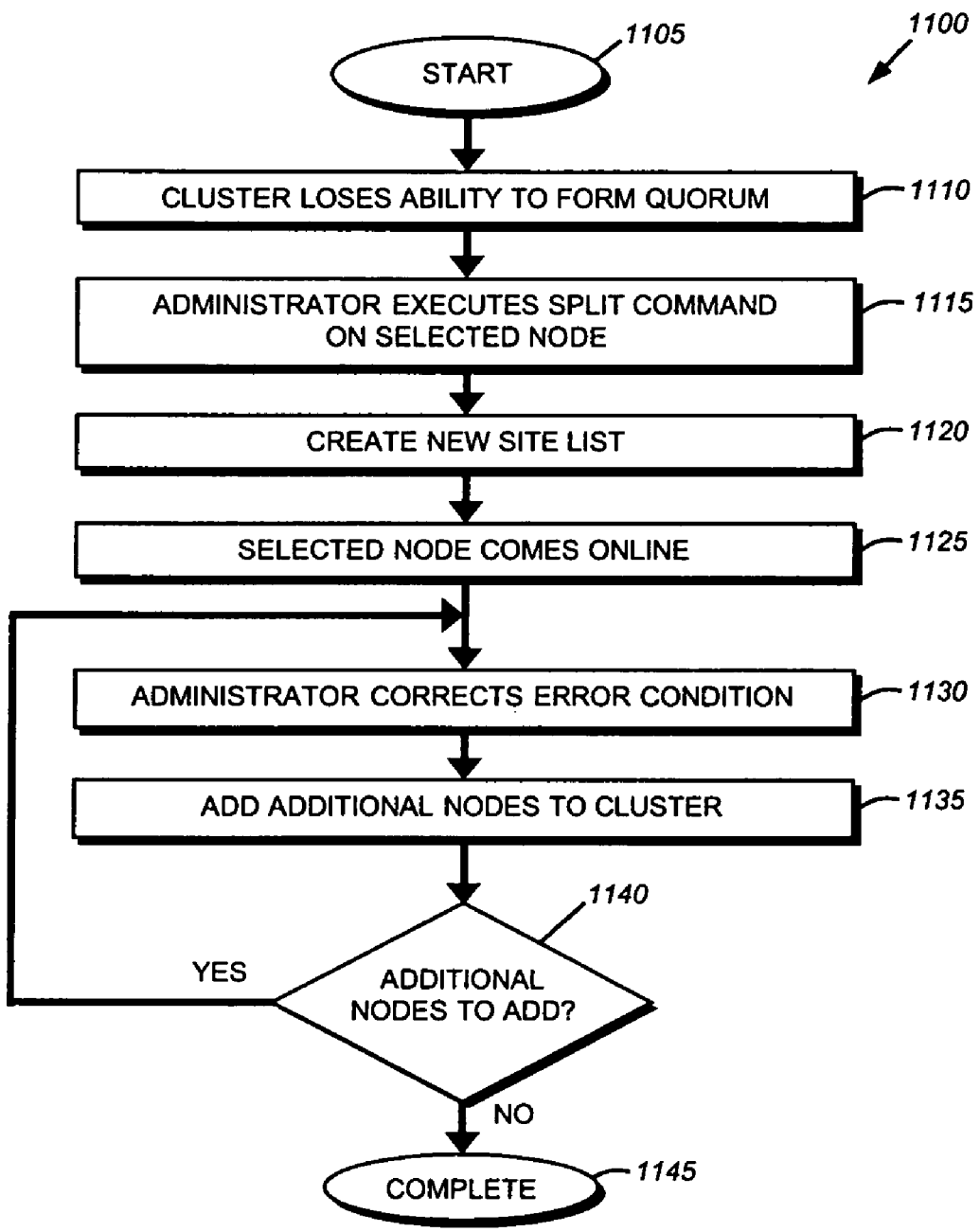
FIG. 11 is a flow chart detailing the steps of a procedure for a disaster recovery split of a node in a cluster in accordance with an embodiment of the present invention.

FIG. 11 is a flow chart detailing the steps of a procedure 1100 of performing a split operation for disaster recovery to a node in a cluster in accordance with an embodiment of the present invention. The procedure begins in step 1105 and continues to step 1110 where the cluster loses the ability to form a quorum. This cluster-wide error condition may arise when a sufficient number of nodes have failed and/or lost connectivity to the other nodes in the cluster so that a majority of nodes are no longer healthy and mutually accessible. Contact disruption may be manifested as loss of votes (heartbeat signals) from other nodes, or failure to propagate transactions. Node failure may be manifested by inability to participate in quorum events, e.g., the inability to save a transactional change to disk when required.

In response to the cluster losing the ability to form quorum, an administrator executes a novel split command on a selected node (step 1115). The split command may be executed via a command line interface (CLI) or activated from a graphical user interface (GUI) provided by the management framework 810 on the selected node. In step 1120, a modified site list is created by illustratively the split command executing on the selected node. As noted, the modified site list for the cluster includes an incremented version number 1005 and a newly generated CID 1010. The modified site list also includes an epsilon value assigned to the selected node. All other nodes in the cluster are marked as ineligible. In response to the new site list, the selected node comes online in step 1125 as the node is in quorum (1+e)/1. Upon detecting that the node is in quorum, the quorum manager 860 alerts the recovery manager 855, which executes a trivial recovery and declares the node to be online. This permits the management services to modify (update) the management data (i.e., to perform write operations with respect to that data). The administrator then corrects the error condition(s) that caused the cluster to lose the ability to form a quorum (step 1130) by, e.g., reinstalling software, modifying configuration settings, or repairing failed hardware. As the error condition(s) are corrected in step 1130, the administrator adds (or reintroduces) an additional node to the cluster in 1135, which results in further modified site lists being generated with the nodes marked as eligible. As each of the ineligible nodes are part of the cluster, but simply marked as ineligible, the administrator reintroduces them to the cluster by marking them as eligible.

Then, in step 1140 a determination is made whether there are additional nodes to add to the cluster. If so, the procedure loops back to step 1130 where the administrator corrects the error condition with the node to be added to the cluster. If there are no additional nodes to be added the procedure completes in step 1140.

Figure 12:
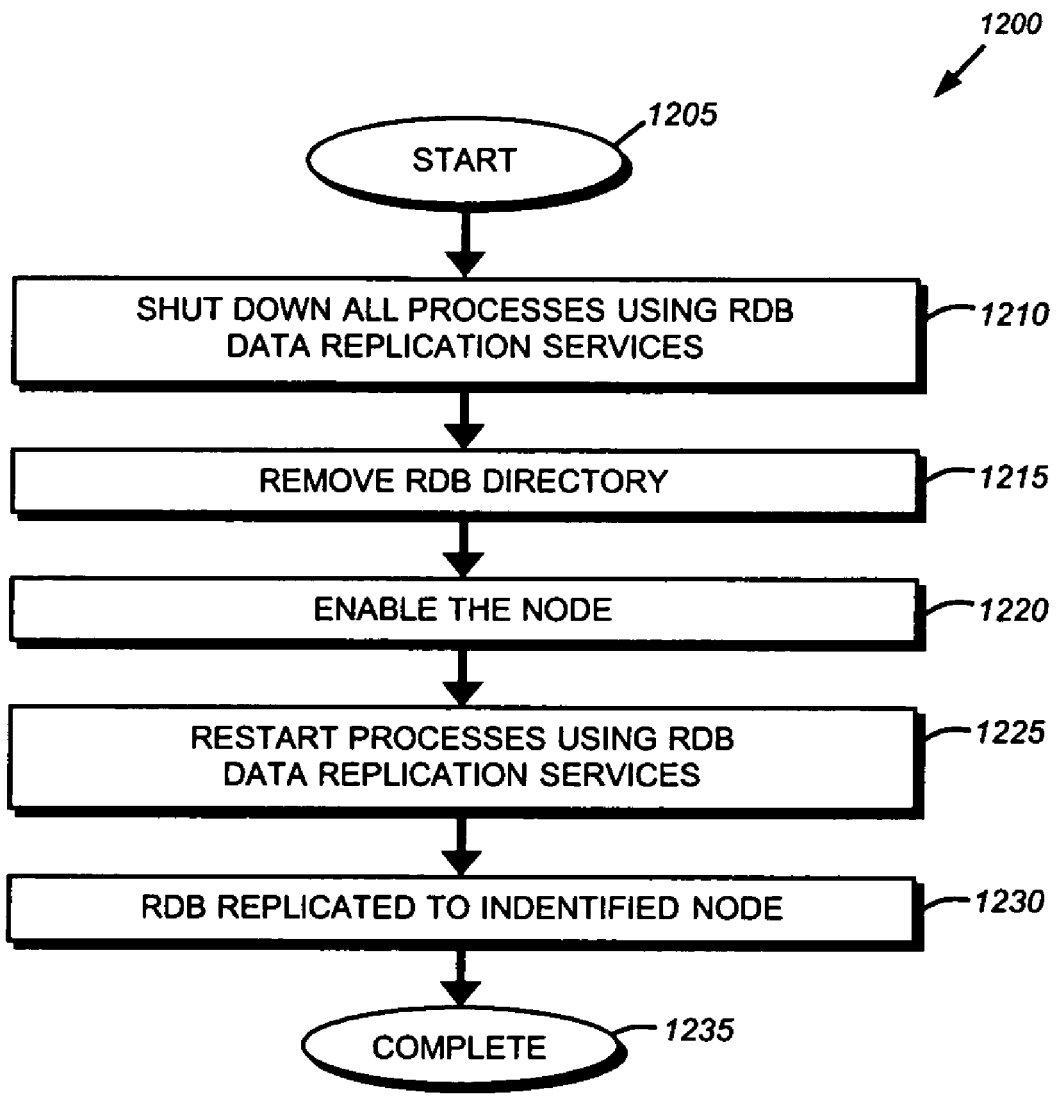
FIG. 12 is a schematic block diagram of an exemplary procedure for adding a node to a repaired cluster in accordance with an embodiment of the present invention.

The task of identifying problems and remedying them, and then reintroducing ineligible nodes as active nodes within the new cluster (step 1135) is typically an iterative process. In a disaster recovery scenario, it is normal to rebuild the cluster incrementally. When an administrator is ready to reintroduce a particular node, the administrator executes an unsplit command on that node. The steps performed by the unsplit command are shown in procedure 1200 of FIG. 12. In response to the administrator executing the unsplit command on the selected node, the procedure begins in step 1205 and continues to step 1210, where all active processes using RDB data replication are shut down. The RDB directory on the selected node is then removed in step 1215, which removes all traces of RDB data, including, for example, the site list along with all appropriate sub-directories of the management processes 800, the high availability manager (HA Mgr) process 820 and the VFS location database (VLDB) process 830. Once the RDB directory has been removed, the selected node is then marked as eligible by a request to some other node in the new cluster (step 1220). At this point, the target node is technically eligible in the new cluster, but has not yet learned of that fact. Then, in step 1225, the processes that use RDB data replication services are restarted. In response to this, the RDB is replicated to the selected node from the other active nodes in the cluster (step 1230). The procedure then completes in step 1235.

To again summarize, the present invention provides a system and method for splitting a single node out of a cluster for disaster recovery purposes. To split a node, the administrator executes a split a command on the node that generates a new site list data structure that defines a new cluster modeled from the original cluster. The new site list has all nodes in the cluster except for the selected node marked as ineligible, thereby placing the selected node in quorum for the cluster. Once the selected node is in quorum, the administrator may correct the error condition(s) and then migrate additional nodes to the new cluster to bring it to its completed state; this is typically an iterative process. Additional nodes may be nodes introduced into the new cluster by executing an unsplit command for each one.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems wherein each system performs one or more of the functions. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for operating a cluster of servers, comprising:
   detecting that an error condition has occurred in a plurality of servers, the plurality of servers making up the cluster, the error condition initiated in response to the clusters inability to meet a conventional quorum requirement and preventing any write operations from occurring on any one server of the plurality of servers and wherein the conventional quorum state requires a majority of the nodes to be healthy to have quorum;
   determining that a selected server of the plurality of servers is functioning correctly;
   executing a split command by a user to override the quorum requirement by designating the selected server as a full read/write replica of the cluster and forming a cluster of one server from the selected server, the cluster now having a stand alone server and a cluster configuration of one to one thereby allowing the server to be modified without use of a voting system; and
   assigning a workload of the cluster to the cluster of one server.

2. The method of claim 1, further comprising:
   determining that another server of the plurality of servers is functioning correctly, and
   executing an unsplit command to bring the another server into the cluster of one server to form a cluster of two servers.

3. The method of claim 2, further comprising:
   detecting further servers which are functioning correctly, and bringing each into the cluster of two to form a new cluster of a plurality of servers.

4. The method of claim 1, further comprising:
   executing the split command by a person, the split command executed in a command line interface of a management framework process executing on the selected server.

5. The method of claim 1, further comprising:
   executing the split command by a person, the split command executed via a graphical user interface of a management framework process executing on the selected server.

6. The method of claim 1, further comprising:
   creating a modified site list data structure for the cluster of one server.

7. The method of claim 1, further comprising:
   creating a modified site list data structure for the cluster of one server by assigning an epsilon value to the selected server.

8. The method of claim 1, further comprising:
   executing an unsplit command to reintroduce an additional server to the cluster.

9. The method of claim 1, further comprising:
   introducing an additional server to the cluster by;
   selecting a server to be added;
   stopping processes using a replicated database directory on the server to be added;
   removing a replicated database directory from the server to be added;
   marking the server to be added as eligible in the modified site list data structure;
   restarting the process using the replicated database directory on the server to be added; and
   replicating the replicated database directory to the server to be added from another server in the cluster.

10. The method of claim 1, further comprising:
creating a site list data structure having a version field, a cluster identification field, an epsilon field, and one or more entries, each of the one or more entries associated with a server in the cluster.

11. The method of claim 10, further comprising:
creating as entries a site identifier field and a state field.

12. The method of claim 1, wherein each node is healthy when the node is active and responding to one or more client requests.

13. A cluster of servers, comprising:
a plurality of servers that develops an error condition, the plurality of servers making up the cluster, the error condition is detected, the error condition initiated in response to the clusters inability to meet a conventional quorum requirement and preventing any write operations from occurring on any one server of the plurality of servers and wherein the conventional quorum state requires a majority of the nodes to be healthy to have quorum;
a server which is determined to be functioning correctly is selected, hereinafter the selected server;
a split command that is executed by a user to override the quorum requirement by designating the selected server as a full read/write replica of the cluster and forming a cluster of one server from the selected server, the cluster now having a stand alone server and a cluster configuration of one to one thereby allowing the server to be modified without use of a voting system; and
a workload of the cluster assigned to the cluster of one server.

14. The cluster of servers of claim 11, further comprising:
another server of the plurality of servers is determined to be functioning correctly, and
an unsplit command executed to bring the another server into the cluster of one server to form a cluster of two servers.

15. The cluster of servers of claim 13, further comprising:
further servers which are functioning correctly, and each functioning further server is brought into the cluster of two to form a new cluster of a plurality of servers.

16. The cluster of servers of claim 13, further comprising:
the split command is executed by a person, the split command executed in a command line interface of a management framework process executing on the selected server.

17. The cluster of servers of claim 13, further comprising:
the split command executed by a person, the split command executed via a graphical user interface of a management framework process executing on the selected server.

18. The cluster of servers of claim 13, further comprising:
a modified site list data structure is created for the cluster of one server.

19. The cluster of servers of claim 13, further comprising:
a modified site list data structure for the cluster of one server has an epsilon value assigned to the selected server.

20. The cluster of servers of claim 13, further comprising:
an unsplit command executed to reintroduce an additional server to the cluster.

21. The cluster of servers of claim 13, further comprising:
an additional server is introduced to the cluster by:
selecting a server to be added;
stopping processes using a replicated database directory on the server to be added;
removing the replicated database directory from the server to be added;
marking the server to be added as eligible in the modified site list data structure to be added;
restarting the process using the replicated database directory on the server to be added; and
replicating the replicated database directory to the server to be added from another server in the cluster.

22. The cluster of servers of claim 13, further comprising:
a site list data structure is created, the site list data structure having a version field, a cluster identification field, an epsilon field, and one or more entries, each of the one or more entries associated with a server in the cluster.

23. The cluster of servers of claim 22, further comprising:
entries of the site list data structure including a site identifier field and a state field.

24. The cluster of servers of claim 13, wherein each node is healthy when the node is active and responding to one or more client requests.

25. A computer readable media, comprising:
said computer readable media containing instructions for execution on a processor for a method of operating a cluster of servers, the method having the steps of,
detecting that an error condition has occurred in a plurality of servers, the plurality of servers making up the cluster, the error condition initiated in response to the clusters inability to meet a conventional quorum requirement and preventing any write operations from occurring on any one server of the plurality of servers and wherein the conventional quorum state requires a majority of the nodes to be healthy to have quorum;
determining that a selected server of the plurality of servers is functioning correctly;
executing a split command to override the quorum requirement by designating the selected server as a full read/write replica of the cluster and forming, a cluster of one server from the selected server computer, the cluster now having a stand alone server and a cluster configuration of one to one thereby allowing the server to be modified without use of a voting system; and
assigning a workload of the cluster to the cluster of one server.

26. A method for operating a cluster of servers, comprising:
detecting that an error condition has occurred in a plurality of servers, the plurality of servers making up the cluster;
determining that a failure of the cluster resulted in the impossibility of a conventional quorum being achieved preventing a write operation from occurring on any one server of the plurality of servers and wherein the conventional quorum state requires a majority of the nodes to be healthy to have quorum;
executing a split command by a user to override the quorum requirement by designating a selected server as a full read/write replica of the cluster and forming a cluster of one server from the selected server, the cluster now having a stand alone server and a cluster configuration of one to one thereby allowing the server to be modified without use of a voting system; and
assigning a workload of the cluster to the cluster of one server.

27. The method of claim 26, further comprising:
determining that another server of the plurality of servers is functioning correctly, and
executing an unsplit command to bring the another server into the cluster of one server to form a cluster of two servers.

28. The method of claim 27, further comprising:
detecting further servers which are functioning correctly, and bringing each into the cluster of two to form a new cluster of a plurality of servers.

29. The method of claim 26, further comprising:
executing the split command by a user, the split command executed in a command line interface of a management framework process executing on the selected server.

30. The method of claim 26, further comprising:
executing the split command by a person, the split command executed via a graphical user interface of a management framework process executing on the selected server.

31. The method of claim 26, further comprising:
creating a modified site list data structure for the cluster of one server.

32. The method of claim 26, further comprising:
creating a modified site list data structure for the cluster of one server by assigning an epsilon value to the selected server.

33. The method of claim 26, further comprising:
executing an unsplit command to reintroduce an additional server to the cluster.

34. The method of claim 26, further comprising:
introducing an additional server to the cluster by;
  selecting a server to be added;
  stopping processes using a replicated database directory on the server to be added;
  removing a replicated database directory from the server to be added;
  marking the server to be added as eligible in the modified site list data structure;
  restarting the process using the replicated database directory on the server to be added; and
  replicating the replicated database directory to the server to be added from another server in the cluster.

35. The method of claim 26, further comprising:
creating a site list data structure having a version field, a cluster identification field, an epsilon field, and one or more entries, each of the one or more entries associated with a server in the cluster.

36. The method of claim 35, further comprising:
creating as entries a site identifier field and a state field.

37. A cluster of servers, comprising:
a plurality of servers that develops an error condition, the plurality of servers making up the cluster;
a server which determined that a failure of the cluster resulted in the impossibility of a conventional quorum being achieved preventing a write operation from occurring on any one server of the plurality of servers and wherein the conventional quorum state requires a majority of the nodes to be healthy to have quorum;
a split command by a user to override the quorum requirement by that is executed to designate a selected server as a full read/write replica of the cluster and forming a cluster of one server from the selected server, the cluster now having a stand alone server and a cluster configuration of one to one thereby allowing the server to be modified without use of a voting system; and
a workload of the cluster assigned to the cluster of one server.

38. A computer readable media, comprising:
said computer readable media containing instructions for execution on a processor for a method of operating a cluster of servers, the method having the steps of:
detecting that an error condition has occurred in a plurality of servers, the plurality of servers making up the cluster;
determining that a failure of the cluster resulted in the impossibility of a conventional quorum being achieved preventing a write operation from occurring on any one server of the plurality of servers and wherein the conventional quorum state requires a majority of the nodes to be healthy to have quorum;
executing a split command by a user to override the quorum requirement by designating a selected server as a full read/write replica of the cluster and forming a cluster of one server from the selected server, the cluster now having a stand alone server and a cluster configuration of one to one thereby allowing the server to be modified without use of a voting system; and
assigning a workload of the cluster to the cluster of one server.

* * * * *